Dec. 17, 1940.   C. W. LA PIERRE   2,225,346
PHASE ANGLE INDICATOR
Filed Aug. 19, 1939

Inventor:
Cramer W. La Pierre,
by Harry E. Dunham
His Attorney.

Patented Dec. 17, 1940

2,225,346

UNITED STATES PATENT OFFICE 2,225,346

PHASE ANGLE INDICATOR

Cramer W. La Pierre, Schenectady, N. Y., assignor to General Electric Company, a corporation of New York Application August 19, 1939, Serial No. 291,059

5 Claims. (Cl. 172—238)

My invention relates to electrical instruments and concerns particularly apparatus responsive to phase relationship between alternating or harmonic quantities.

It is an object of my invention to provide a simple, reliable device for accurately measuring small phase angles, particularly small phase angles between voltages.

Another object of my invention is to provide apparatus for bring two alternating-current circuits into phase coincidence or for producing a predetermined phase relationship between two alternating-current circuits or between two different points in an alternating-current system.

Other and further objects of my invention will become apparent as the description proceeds.

Figure 1:
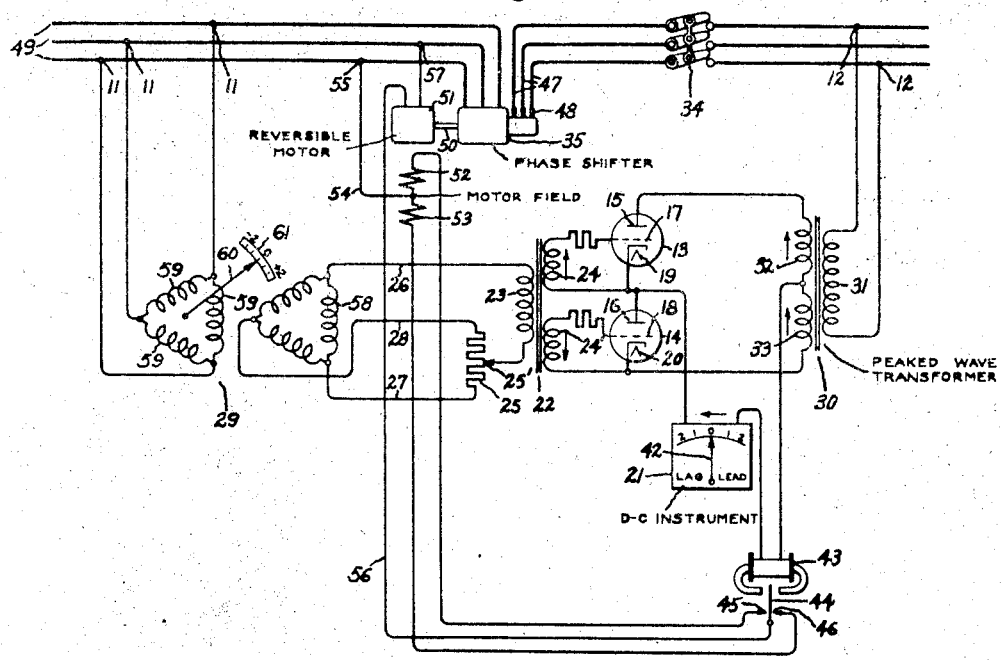
Figure 2:
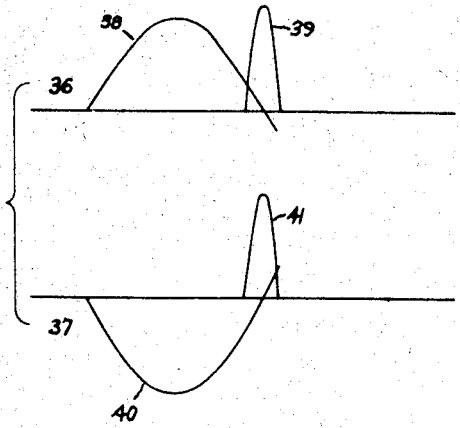

My invention will be understood more readily from the following detailed description when considered in connection with the accompanying drawing, and those features of the invention which are believed to be novel and patentable will be pointed out in the claims appended hereto. In the drawing, Fig. 1 is a circuit diagram of one embodiment of my invention, and Fig. 2 is a pair of graphs illustrating the principle of operation of the apparatus illustrated in Fig. 1.

The drawing illustrates apparatus which may be used for measuring the phase relationship between the voltages at two points, such as the points A and B in alternating-current circuits which may be independent circuits of an alternating-current system or may be portions of the same circuit. The apparatus may be employed also for bringing about phase coincidence between the voltages at the points A and B or for maintaining a predetermined phase difference.

In order to make the apparatus responsive to small differences in phase relationship of the order of two degrees or less, a peaking transformer is employed for narrowing the alternating voltage wave supplied from the point B, and discharge-tube circuits are employed for comparing the narrow wave with the undistorted wave from the point A. Terminals 11 are provided for connection of leads from the phase responsive apparatus to the alternating-current system at A and terminals 12 are provided for connecting leads from the phase responsive apparatus to the alternating-current system at B.

A pair of discharge devices 13 and 14 is provided having anodes 15 and 16, control electrodes 17 and 18, and cathodes 19 and 20, respectively The connections are so made that a peaked wave derived from the terminals 12 is supplied in the anode circuit of the tube 13, through the anode 15 and cathode 19, and to the anode circuit of the tube 14 through the anode 16 and the cathode 20. An alternating-current wave derived from the terminals 11 but in quadrature with the voltage between the pair of terminals of the set 11 corresponding to the terminals 12 is supplied to the control electrodes 17 and 18 with the polarity of one control electrode the opposite of that of the other. A center-zero direct-current instrument 21 is provided for comparing the anode currents in the tubes 13 and 14. The arrangement is such that when the voltages from the points A and B are in phase coincidence the control electrodes, and the anodes of the two discharge devices 13 and 14, are subjected to positive voltages for equal periods of time and there is no difference in the anode circuits. However, when phase difference takes place in the discharge devices the control electrode remains positive for a longer period of time during the application of positive voltage to the anode so that more current flows in one discharge device than the other, serving to give an indication of the phase difference.

The discharge devices 13 and 14 are preferably of the electron discharge type, in which current flow increases with the increase of potential applied to the control electrode during the application of positive voltage to the anode and in which current flow ceases when the control electrode potential drops to a predetermined value near zero or sufficiently below zero. If desired, electron discharge tubes of the type known as liotrons may be employed, which may be referred to as hard vacuum tubes in distinction from vapor-discharge tubes in which current flow once initiated continues regardless of control-electrode potential during the maintenance of sufficient positive potential on the anode. In order that the control electrodes 17 and 18 may be energized with opposite polarities, the voltage derived from the terminal 11 may be applied through a transformer 22 having a primary winding 23 and two secondary windings 24 and 24' suitably connected to provide opposite potentials. A simple quadrature phase shifter in the form of a resistor 25 having a center tap 25' is interposed between the terminals 11 and the primary winding 23, one of the three phase leads 26 being connected to the upper end of the winding 23 and the other two three-phase leads 27 and 28 being connected across the ends of the resistor 25 with the tap 25' connected to the lower end of the winding 23. The tap 25' may be made adjustable for the purpose of slight adjustment in the quadrature relationship for reasons which will be mentioned hereinafter. If desired a transformer 29 may be interposed between the terminals 11 and the leads 26, 27 and 28. The use of three terminals 11 and the application of polyphase voltage therefrom to the phase shifter 25 permits the use of a less expensive quadrature phase shifter than would be the case if only two of the terminals 11 and single phase input to the quadrature phase shifter were employed. It will be understood, however, that my invention is not limited to the precise arrangement shown.

For applying peak waves to the anodes 15 and 16 a peak wave transformer 30 is provided having a primary winding 31 connected to the terminals 12 and having a pair of secondary windings 32 and 33 connected in series with additive polarity. The winding 32 is connected at the upper end to the anode 15 and at the lower end through the direct-current instrument 21 to the anode 19 of the tube 13, which is, in turn, connected to the anode 16 of the tube 14. The upper end of the peak wave transformer winding 33 is thus connected through the instrument 21 to the anode 16 and the lower end of the winding 33 is connected to the anode 20 so that the transformer 30 provides voltages of the same polarity to the anodes 15 and 16.

For interconnecting the electrical circuits A and B when the desired phase relationship has been obtained, a connecting switch 34 may be provided, and for the purpose of bringing about the proper phase relationship suitable means such as a phase shifter 35, for example, may be provided. It will be understood that the electrical conductors leading to the points A and B may come from A. C. power sources to be paralleled or that one or the other of the circuits may include only power consuming apparatus. Since power may flow in one direction or the other when the switch 34 is closed, I refer to the circuits of the points A and B as power circuits without specifying whether one or the other is a power producing or a power consuming circuit.

The principle of operation of the phase indicator will be apparent from the curves shown in Fig. 2, in which the graph 36 represents the conditions in the tube 13 and the graph 37 represents the conditions in the tube 14. The curve 38 represents the voltage applied to the grid 17 and the curve 39 represents the voltage applied to the anode 15, whereas the curve 40 represents the voltage applied to the control electrode 18 and the curve 41 represents the voltage applied to the anode 16. It will be observed that the voltages 38 and 40 are of opposite polarities, whereas the voltages 39 and 41 are of the same polarity. It will be understood that the curves of Fig. 2 are plotted with voltages measured in the vertical direction and time measured along the horizontal axis. The peak wave transformer 30 is not a part of my invention and need not, therefore, be described in detail other than to point out that the secondary voltages consist of narrow peaks, such as illustrated at 39 and 41, instead of pure sine waves, even when a sine wave voltage is applied to the primary 31. The design of the peak wave transformer may be modified in accordance with principles well known to those skilled in the art to obtain a peak wave sufficiently narrow for any desired sensitivity of the phase indicating apparatus. If the width of the waves 39 and 41 is approximately two electrical degrees, the maximum reading of the instrument 21 will represent phase lag or lead of two electrical degrees, and accordingly a very sensitive indication of the small variations in phase relationship may be obtained.

The curves of Fig. 2 represent the condition when there is an exact coincidence in phase relationship between the voltages being compared. One may observe that the curves 38 and 40 each intersect the zero axis at the mid-point of the peak waves 39 and 41, respectively. In case the voltage at the point B should lag slightly behind the voltage at the point A, however, the wave 38 would intersect the zero axis at an earlier point in the wave 39 causing the voltage of the control electrode to be negative for a greater portion of time during the continuance of the positive voltage on the anode 15 represented by the voltage 39, thus decreasing the current flowing through the tube 13. Similarly, the lag in the voltage at the point B would cause the curve 40 to intersect the zero axis earlier in the wave 41 causing the control electrode voltage of the tube 14 to be positive for a greater period of time during the continuance of the positive voltage on the anode 16 represented by the voltage 41, thus increasing the current flowing through the tube 14. It will be apparent from the diagram of Fig. 1 that the instrument 21 measures a difference between the anode currents of the tubes 13 and 14 and, accordingly, the current would flow to the left through the instrument 21, assuming the polarities of the transformers indicated by arrows, causing the pointer 42 to deflect to the left, indicating that the phase relationship is a lagging one with respect to point A and giving a measurement of the angle of lag. Similarly a leading phase angle would result in instrument deflection to the right.

My invention is not limited to giving mere indications and measurements of phase relationship, but includes also the automatic maintenance of proper relationships between electrical circuits or parts of an electrical system. In connection with complicated network systems, for example, it has been necessary to maintain a predetermined phase lag or phase advance between two points in the system in order to cause the power to flow through a given set of conductors and to prevent overloading of other conductors. Similarly, in the case of automatic connection of additional generating units when load increases, it is necessary to provide means for causing the interconnection to take place only when the additional generating equipment bears the proper phase relationship to the energized load to which it is to be connected. For automatically controlling phase relationships, the direct current instrument 21 may be replaced by a contact-making instrument, or a suitable device, such as a polarized relay 43, may be connected in series with the instrument 21. The relay 43 is shown conventionally and includes an armature and movable contact 44 cooperating with a pair of stationary contacts 45 and 46 in such a manner that no contact is made when the relay 43 is not energized and contact is made with either the contact 45 or the contact 46 when the relay is energized, according to whether the current flows in one direction or the other.

The phase shifter 35 may be of any desired type but for the purpose of avoiding fouling of flexible leads and permitting continuous correction of the phase relationship in either direction the device is represented as being of the type having one set of leads 47 connected to brushes 48 cooperating with slip-rings, not shown, and having another set of leads 49 connected to stationary terminals, the arrangement being such that rotation of the armature, not shown, connected to a shaft 50, varies the phase relationship between the voltages appearing at the leads 49 and 47. It will be understood that one or the other set of leads 47 and 49 will serve as input terminals or as output terminals, according to the direction of power flow between the points A and B.

For setting the movable elements of the phase shifter 35 in the proper position, a reversible motor 51 is provided, which is mechanically connected to the shaft 50 and has suitable connections whereby it may be reversed in direction of rotation by a double-throw contact. For example, the motor 51 may be of the double-field series type having a pair of oppositely connected field windings 52 and 53 and a common terminal 54 connected to one terminal 55 of a source of current, with the other ends of the field windings connected to the stationary contacts 45 and 46 of the polarized relay 43, the movable contact 44 being connected in series with the lead 56 through the armature, not shown, of the motor 51 to a second terminal 57 of the energizing current source. The source 55—57 may, if desired, be a phase of one of the circuits A which is to be compared in phase angle.

It will be apparent that when the voltages of the points A and B are in phase no current will flow in the relay 43, but when the voltages are out of phase, current will flow in one direction or the other according to the sign or direction of the phase difference, causing current to flow through one of the field windings 52 or 53 of the motor 51. The arrangement is such that if the voltage at the point B is lagging, the proper field winding, for example the field winding 52, will be energized to cause the reversible motor 51 to rotate in a direction bringing about the necessary correction in phase relationship. Similarly the opposite field winding will be energized if the voltage is leading. If desired, a relay or a switch-closing winding connected in series with the instrument 21 and a restraining spring may also be provided for operating the switch blades 34 in such a manner that the blades are held open as long as current flows in either direction through the circuit of the instrument 21, but the switch 34 is closed as soon as the current drops to zero or to a small value indicating sufficiently close phase coincidence between the points A and B to permit interconnecting the electrical circuits of A and B.

In cases where the apparatus is not to be employed for automatically connecting additional generating equipment but for maintaining a fixed phase difference between two different electrical circuits or two different points in an electrical system, as in connection with network systems, an adjustment may be provided whereby the current in the instrument 21 will become zero when there is actually a fixed difference in phase between the voltages at the points A and B. For example, the tap 25' of the phase shifting resistor 25 may be slid in one direction or the other so as to cause the voltage between the winding 23 of the transformer 22 and the transformer winding 58 of the interposed transformer 29 to depart slightly from quadrature. If greater variations are desired than can be obtained conveniently by this method, the transformer 29 may be a phase shifting transformer, having one of its sets of windings, for example, the primary windings 59 in the form of an armature rotatable with respect to the secondary windings and carrying a pointer 60 cooperating with a scale 61 calibrated in phase angle. Thus, if it is known that a phase difference of plus one degree is necessary between points B and A in order to cause a proper amount of power to flow, the phase shifting transformer 29 may be set in position with its pointer 60 opposite the plus one point on the scale 61 so that an exact quadrature will be obtained between the control electrode and anodes of the tubes 13 and 14, when the desired phase difference takes place between the points A and B, and the phase shifter 35 will be driven in one direction or the other until the desired phase difference is obtained.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. A phase-responsive device comprising terminals adapted to be connected to a point in an alternating-current circuit, terminals adapted to be connected to another point in the same or a second alternating-current circuit, the phase relationship of which is to be compared with the first, a pair of electron discharge devices each having an anode, a cathode, and a control electrode, a peaking transformer, a direct-current instrument, and means interposed between said control electrodes and one of said sets of terminals for introducing a substantially quadrature voltage relationship between said control electrodes and the anodes when the terminal voltages are in phase, said peaking transformer having a primary winding connected to the other of said sets of terminals, having a pair of secondary windings, one of which is connected in the anode circuit of one of said discharge devices and the other of which is connected in the anode circuit of the other of said discharge devices, said direct-current instrument being connected in a common line to both said anode circuits, the connections being such that voltages applied to the control electrodes are of opposite polarities and voltages applied to the anodes are of like polarity.

2. A phase-responsive device for an electrical system, comprising terminals adapted to be connected to an alternating-current circuit, terminals adapted to be connected to a second alternating-current circuit, the phase relationship of which is to be compared with the first, a pair of electron discharge devices each having an anode, a cathode, and a control electrode, a peaking transformer, a polarized relay, means for connecting one of said sets of terminals to the control electrodes of said discharge devices and introducing a substantially quadrature voltage relationship between said discharge device electrodes when the voltages at said terminals are in phase, a reversible motor and a phase shifter, said peaking transformer having a primary winding connected to the other of said sets of terminals, and having a pair of secondary windings, one of which is connected in the anode circuit of one of said discharge devices and the other of which is connected in the anode circuit of the other of said discharge devices, said polarized relay having a winding connected in a common line to both of said anode circuits and having double-throw contacts, said reversible motor having connections controlled thereby, whereby it is driven in one direction in response to current flowing in a given direction to the polarized relay winding and in an opposite direction responsive to current flowing in the opposite direction to the polarized relay winding, and stands still when the polarized relay is deenergized, the reversible motor being mechanically connected to the phase shifter and said phase shifter having input terminals connected to one of said previously mentioned sets of terminals, and output terminals adapted to be connected to the other of said sets of terminals, whereby a predetermined phase relationship may be maintained in the system.

3. A pair of alternating-current power circuits adapted to be interconnected, sets of terminals connected to each of them, a pair of electron discharge devices each having an anode, a cathode, and a control electrode, a peaking transformer, a direct-current instrument and means for connecting one of said sets of terminals to the control electrodes of said discharge devices and introducing a quadrature relationship between the voltages upon said anodes and the voltages at said control electrodes when the voltages at the sets of terminals are in phase, said peaking transformer having a primary winding connected to the second of said sets of terminals, having a pair of secondary windings, one of which is connected in the anode circuit of one of said discharge devices and the other of which is connected in the anode circuit of the other of said discharge devices, the connections being such that voltages of opposite polarities are applied to the control electrodes and voltages of the same polarity are applied to the anodes of said discharge devices, said direct-current instrument being connected in a common line to the anode circuits of said discharge devices, whereby said direct-current instrument deflects in one direction or the other in accordance with the sign and magnitude of the phase difference between the voltages at said sets of terminals.

4. A phase-responsive devise comprising in combination a set of terminals adapted to be connected to a point in an alternating-current circuit, a second pair of terminals adapted to be connected to another point in the same or a different alternating-current circuit, the voltage of which is to be compared in phase relationship with voltage at the point of connection at the first set of terminals, a phase-responsive instrument connected to said sets of terminals, and an adjustable phase shifter interposed between said instrument and one of said sets of terminals for causing said phase instrument to give a nul response with a predetermined magnitude and direction of phase difference between the voltages at the points of connection of said sets of erminals.

5. A phase-responsive device for an electrical system comprising in combination a set of terminals adapted to be connected to a point in an alternating-current circuit, a second pair of terminals adapted to be connected to another point in the same or a different alternating-current circuit, the voltage at which is to be compared in phase relationship with voltage at the point of connection at the first set of terminals, a phase-responsive instrument connected to said sets of terminals, an adjustable phase shifter interposed between said instrument and one of said sets of terminals for causing said phase instrument to give a nul response with a predetermined magnitude and direction of phase difference between the voltages at the points of connection of said sets of terminals, a second phase shifter, a reversible motor mechanically connected thereto, said phase instrument including a polarized relay having double-throw contacts, said reversible motor having connections controlled by said double-throw contacts for causing it to rotate in either direction or stand still in accordance with the condition of energization of said polarized relay, said second phase shifter having terminals adapted to be connected to one of said points in the alternating-current circuit and having terminals adapted to be connected to the other of said points in the alternating-current circuit, whereby said latter phase shifter will be driven in one direction or the other in accordance with the phase difference to being about a predetermined phase relationship in the system.

CRAMER W. LA PIERRE.

CERTIFICATE OF CORRECTION.

Patent No. 2,225,346.  December 17, 1940.

CRAMER W. LA PIERRE.

It is hereby certified that error appears in the printed specification of the above numbered patent requiring correction as follows: Page 1, first column, line 10, for the word "bring" read --bringing--; page 3, first column, line 11, for "elements" read --element--; page 4, first column, line 47, claim 4, for "devise" read --device--; and second column, line 47, claim 5, for the word "being" read --bring--; and that the said Letters Patent should be read with this correction therein that the same may conform to the record of the case in the Patent Office.

Signed and sealed this 4th day of February, A. D. 1941.

(Seal)

Henry Van Arsdale,
Acting Commissioner of Patents.